(12) United States Patent
Tsen

(10) Patent No.: US 7,250,810 B1
(45) Date of Patent: Jul. 31, 2007

(54) MULTI-MODE CHARGE PUMP DRIVE CIRCUIT WITH IMPROVED INPUT NOISE AT A MOMENT OF MODE CHANGE

(75) Inventor: Chia-Hung Tsen, Hsinchu County (TW)

(73) Assignee: Aimtron Technology Corp., Hsinchu (TW)

( * ) Notice: Subject to any disclaimer, the term of this patent is extended or adjusted under 35 U.S.C. 154(b) by 0 days.

(21) Appl. No.: 11/467,153

(22) Filed: Aug. 24, 2006

Related U.S. Application Data

(63) Continuation-in-part of application No. 11/306,408, filed on Dec. 27, 2005.

(51) Int. Cl.
*G05F 1/10* (2006.01)

(52) U.S. Cl. ...................... 327/536; 315/291

(58) Field of Classification Search ................ 327/514, 327/536; 315/291
See application file for complete search history.

(56) References Cited

U.S. PATENT DOCUMENTS

| | | | |
|---|---|---|---|
| 6,107,862 A | 8/2000 | Mukainakano et al. | |
| 6,400,211 B1 | 6/2002 | Yokomizo et al. | |
| 6,411,531 B1 | 6/2002 | Nork et al. | |
| 6,504,422 B1 | 1/2003 | Rader et al. | |
| 6,512,411 B2 | 1/2003 | Meng et al. | |
| 6,538,394 B2 | 3/2003 | Volk et al. | |
| 6,556,067 B2 | 4/2003 | Henry | |
| 6,657,875 B1 | 12/2003 | Zeng et al. | |
| 6,690,146 B2 | 2/2004 | Burgyan et al. | |
| 6,836,157 B2 * | 12/2004 | Rader et al. | ................... 327/66 |

OTHER PUBLICATIONS

"IA Low Noise High Current LED Charge Pump With Independent Torch/Flash Current Control", Linear Technology, LTC3216, pp. 1-12, Linear Technology Corporation, 2004.

* cited by examiner

*Primary Examiner*—Kenneth B. Wells
(74) *Attorney, Agent, or Firm*—Winston Hsu

(57) ABSTRACT

A multi-mode charge pump drive circuit has a multi-mode charge pump, a switch control circuit, a current regulation circuit, an error amplifier, a variable resistance unit, and a mode selection circuit. The multi-mode charge pump is operated with a plurality of modes, each of which provides a different multiplicative ratio for converting an input voltage source into a drive voltage. The switch control circuit applies a switch control signal to the multi-mode charge pump. The switch control signal has a slew rate of edge for determining a transition span of the interchange between charging and discharging phases. The mode selection circuit controls the multi-mode charge pump to selectively operate with one of the plurality of modes. When the mode selection circuit changes the mode of the multi-mode charge pump, the mode selection circuit applies a mode change signal to the switch control circuit so as to reduce the slew rate of edge.

15 Claims, 9 Drawing Sheets

MULTI-MODE CHARGE PUMP DRIVE CIRCUIT WITH IMPROVED INPUT NOISE AT A MOMENT OF MODE CHANGE

CROSS REFERENCE TO RELATED APPLICATION

This application is a continuation-in-part of, and claims benefit of the filling date of, and hereby incorporates fully by reference, a parent application entitled "Charge Pump Drive Circuit For A Light Emitting Diode," Ser. No. 11/306,408, filed Dec. 27, 2005, and assigned to the assignee of the present application.

BACKGROUND OF THE INVENTION

1. Field of the Invention

The present invention relates to a multi-mode charge pump drive circuit and, more particularly, to a multi-mode charge pump drive circuit with improved input noise at a moment of mode change.

2. Description of the Related Art

FIG. 1(a) is a detailed circuit diagram showing a conventional charge pump drive circuit 10. The charge pump drive circuit 10 converts an input voltage source $V_{in}$ into a drive voltage $V_{out}$ for driving a load 11. Sometimes the input voltage source $V_{in}$ is not at an appropriate status to be directly applied for driving the load 11, such as in the case where the input voltage source $V_{in}$ is too high, too low, or fluctuating very much. For this reason, the charge pump drive circuit 10 is necessary for generating an applicable and stable drive voltage $V_{out}$ through regulating the input voltage source $V_{in}$. For example, the conventional charge pump drive circuit 10 is provided with a 1:2 step-up charge pump 12, which is operated alternately between a charging phase and a discharging phase in accordance with switch control signals SC1 and SC2 generated from a switch control circuit 13, thereby generating a drive voltage $V_{out}$ that is twice as large as the input voltage source $V_{in}$.

More specifically, the 1:2 step-up charge pump 12 shown in FIG. 1(a) consists of a first switch S1, a second switch S2, a third switch S3, a fourth switch S4, and a pumping capacitor Cp. The first switch S1 is coupled between the input voltage source $V_{in}$ and a first electrode of the pumping capacitor Cp; the second switch S2 is coupled between the input voltage source $V_{in}$ and a second electrode of the pumping capacitor Cp; the third switch S3 is coupled between the second electrode of the pumping capacitor Cp and a ground potential; and the fourth switch S4 is coupled between the first electrode of the pumping capacitor Cp and the drive voltage $V_{out}$. As shown in FIG. 1(b), the first and second switch control signals SC1 and SC2 generated from the switch control circuit 13 are non-overlapping with respect to each other, each of which is a binary oscillating signal having a high level H and a low level L. The first switch control signal SC1 is applied to the first and third switches S1 and S3 while the second switch control signal SC2 is applied to the second and fourth switches S2 and S4. During the charging phase, such as from time T1 to time T2 and from time T5 to T6, the first and third switches S1 and S3 are turned ON while the second and fourth switches S2 and S4 are turned OFF, causing the first electrode of the pumping capacitor Cp to be connected to the input voltage source $V_{in}$ and the second electrode of the pumping capacitor Cp to be connected to the ground potential. During the discharging phase, such as from time T3 to time T4 and from time T7 to time T8, the second and fourth switches S2 and S4 are turned ON while the first and third switches S1 and S3 are turned OFF, causing the first electrode of the pumping capacitor Cp to be connected to the drive voltage $V_{out}$ and the second electrode of the pumping capacitor Cp to be connected to the input voltage source $V_{in}$. Through the alternate operations between the charging and discharging phases, the pumping capacitor Cp is able to provide the drive voltage $V_{out}$ that is twice as large as the input voltage source $V_{in}$.

In order to maintain the drive voltage $V_{out}$ at the desired regulation value, the conventional charge pump drive circuit 10 is further provided with a feedback control system including a voltage detection circuit 14, an error amplifier 15, a reference voltage source $V_{ref}$, and a variable resistance unit VAR. The voltage detection circuit 14 is directly coupled to the output terminal of the 1:2 step-up charge pump 12 for generating a feedback signal $V_{fb}$ representative of the drive voltage $V_{out}$. As shown in FIG. 1(a), the voltage detection circuit 14 may be implemented by a resistive voltage divider in which the coupling point between the series-connected resistors R1 and R2 is used for providing a partial voltage of $[R2/(R1+R2)]*V_{out}$ as the feedback signal $V_{fb}$. Based on a difference between the feedback signal $V_{fb}$ and the reference voltage source $V_{ref}$, the error amplifier 15 generates an error signal $V_{err}$ for controlling the variable resistance unit VAR. Since the variable resistance unit VAR provides a variable resistance between the input voltage source $V_{in}$ and the pumping capacitor Cp, the charging current into the pumping capacitor Cp during the charging phase may be adjusted and the discharging current out of the pumping capacitor Cp during the discharging phase may be adjusted, thereby effectively regulating the drive voltage $V_{out}$ provided by the pumping capacitor Cp. As a result, when reaching at the stable state the feedback signal $V_{fb}$ is regulated to become substantially equal to the reference voltage source $V_{ref}$ and at the same time the drive voltage $V_{out}$ is correspondingly regulated as expected. Finally through a typical filter 16 for removing some possible ripples, a desired drive voltage $V_{out}$ is applied to the load 11.

Although the conventional charge pump drive circuit 10 shown in FIG. 1(a) is able to provide a stable, regulated drive voltage $V_{out}$ to the load 11, the conventional charge pump drive circuit 10 finds itself incompetent to control the brightness of a light emitting diode that is used as the load 11 because the brightness of the light emitting diode is determined by the drive current rather than the drive voltage. Moreover, in order to ensure that the light emitting diode is actually turned on in any case, the conventional charge pump drive circuit 10 is typically designed to supply a higher-than-necessary drive voltage $V_{out}$ at the cost of reducing the driving efficiency.

SUMMARY OF THE INVENTION

A multi-mode charge pump drive circuit according to the present invention is applied for driving a light emitting diode. The multi-mode charge pump drive circuit includes: a multi-mode charge pump, a switch control circuit, a current regulation circuit, an error amplifier, a variable resistance unit, and a mode selection circuit. The multi-mode charge pump converts an input voltage source into a drive voltage to be supplied to the light emitting diode. The multi-mode charge pump is operated with a plurality of modes, each of which provides a different multiplicative ratio for converting the input voltage source into the drive voltage. The switch control circuit applies a switch control signal to the multi-mode charge pump so as to operate the multi-mode charge pump alternately between a charging phase and a discharging phase. The switch control signal has a slew rate for determining a rate of transferring between the charging phase and the discharging phase. The current regulation circuit has a current setting unit and a current regulating unit. The current setting unit is used for determining a reference current. The current regulating unit has a current regulating terminal and a feedback detecting terminal. The current regulating unit is coupled to the light emitting diode so as to control a current flowing through the light emitting diode to become proportional to the reference current. The feedback detecting terminal is used for providing a feedback signal representative of a current regulation characteristic voltage. The error amplifier generates an error signal based on a difference between the feedback signal and a reference voltage source. The variable resistance unit is coupled between the input voltage source and the multi-mode charge pump for adjusting a variable resistance in response to the error signal. The mode selection circuit controls the multi-mode charge pump to selectively operate at one of the plurality of modes. At a moment when the mode selection circuit changes the mode of the multi-mode charge pump, the mode selection circuit applies a mode change signal to the switch control circuit so as to reduce the slew rate of the switch control signal.

The multi-mode charge pump drive circuit according to the present invention further includes a pull-up circuit coupled to an output terminal of the error amplifier. At the moment when the mode selection circuit changes the mode of the multi-mode charge pump, the pull-up circuit pulls up the error signal in response to the mode change signal.

The pull-up circuit according to the present invention includes: a voltage selecting unit, a voltage reducing unit, a buffering unit, and a switching unit. The voltage selecting unit selects a larger voltage from a group consisting of the input voltage source and the drive voltage. The voltage reducing unit reduces the larger voltage to form a pull-up voltage. The buffering unit serves as an output stage of the pull-up circuit. The switching unit is coupled between the voltage selecting unit and the buffering unit and controlled by the mode change signal such that the pull-up voltage is allowed to be applied to the buffering unit when the switching unit is turned on.

BRIEF DESCRIPTION OF THE DRAWINGS

The above-mentioned and other objects, features, and advantages of the present invention will become apparent with reference to the following descriptions and accompanying drawings, wherein.

DETAILED DESCRIPTION OF THE PREFERRED EMBODIMENTS

The preferred embodiments according to the present invention will be described in detail with reference to the drawings.

Figure 2:
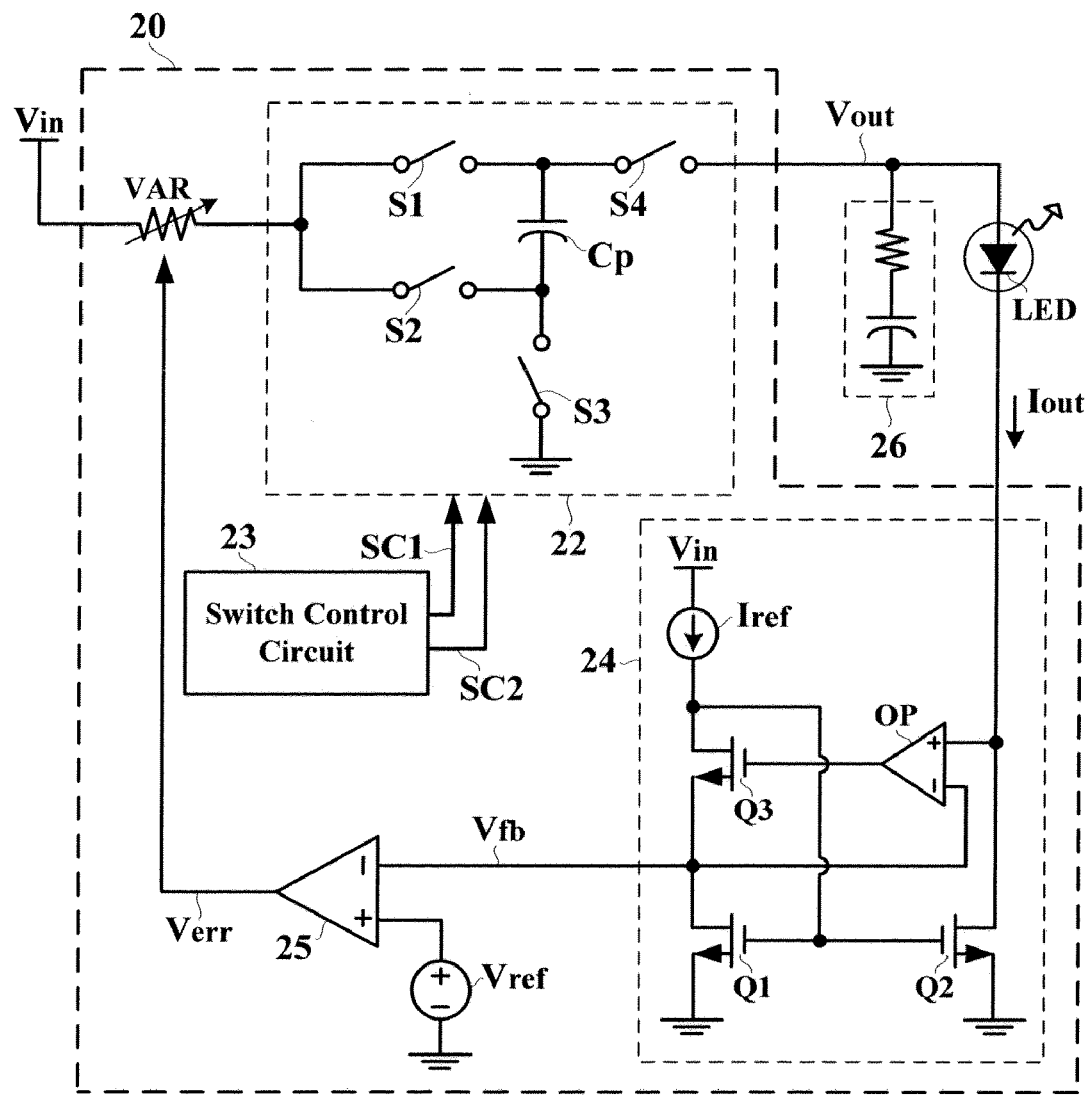
FIG. 2 is a detailed circuit diagram showing a charge pump drive circuit for a light emitting diode according to a first embodiment of the present invention.

FIG. 2 shows a charge pump drive circuit 20 according to a first embodiment of the present invention, for converting an input voltage source $V_{in}$ into a drive voltage $V_{out}$ and providing a regulated drive current $I_{out}$, for driving a light emitting diode LED. The charge pump drive circuit 20 of the first embodiment primarily includes a charge pump 22, a switch control circuit 23, a current regulation circuit 24, an error amplifier 25, and a variable resistance unit VAR.

Figure 1A:
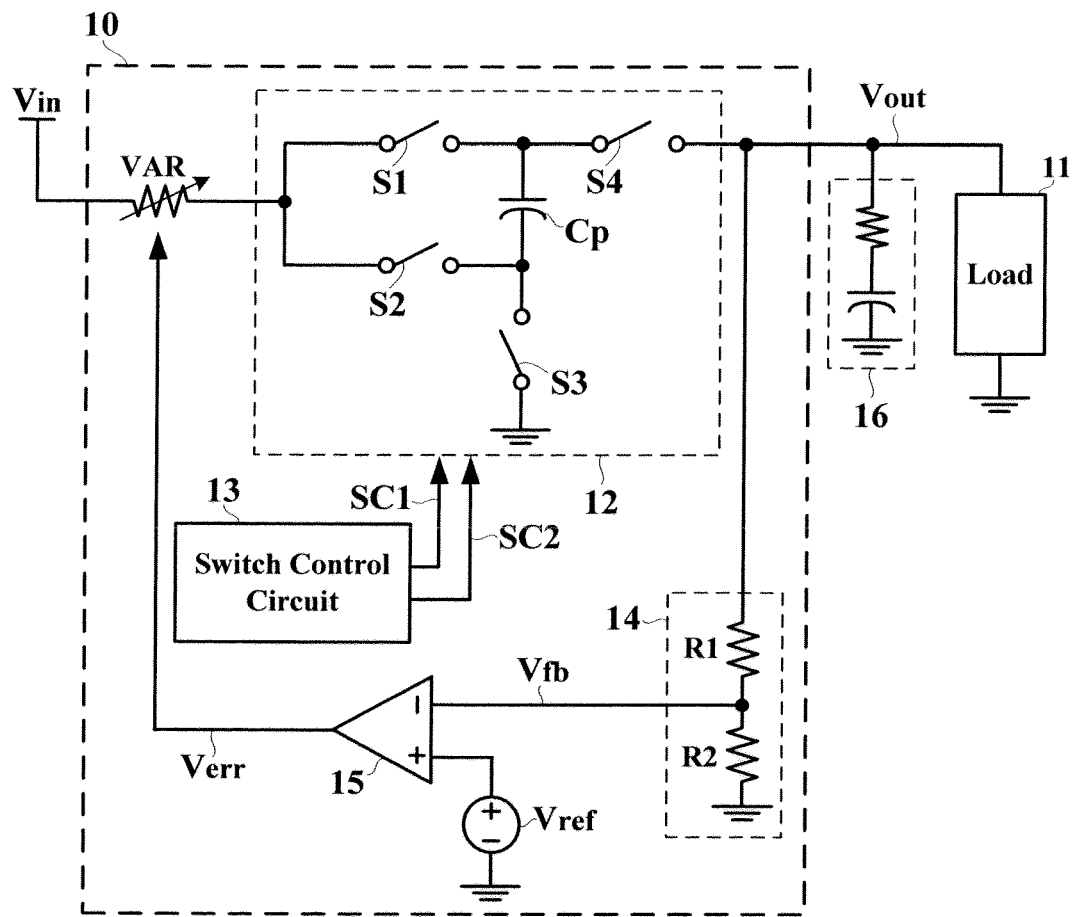
FIG. 1(a) is a detailed circuit diagram showing a conventional charge pump drive circuit.
Figure 1B:
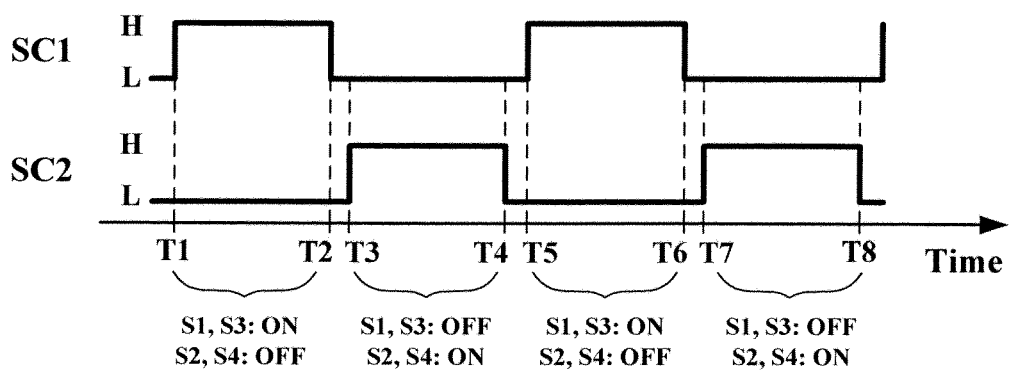
FIG. 1(b) is a waveform timing chart showing switch control signals in a conventional charge pump drive circuit.

The charge pump 22 shown in FIG. 2 is implemented by a 1:2 step-up charge pump whose configuration and operation are substantially identical to the 1:2 step-up charge pump shown in FIG. 1(a), so any further detailed description is omitted here. In accordance with switch control signals SC1 and SC2 generated from a switch control circuit 23, the charge pump 22 may generate a drive voltage $V_{out}$ that is twice as large as the input voltage source $V_{in}$. The switch control signals SC1 and SC2 generated from the switch control circuit 23 are substantially identical to those shown in FIG. 1(b), so any further detailed description is omitted here.

The current regulation circuit 24 controls the drive current $I_{out}$ flowing through the light emitting diode LED to become equal to a predetermined regulation value, such that the brightness of the light emitting diode LED is regulated and kept stable. More specifically, the current regulation circuit 24 has a current setting unit and a current regulating unit. The current setting unit determines a reference current $I_{ref}$. The current regulating unit has a current regulating terminal, coupled to the light emitting diode LED, for controlling the drive current $I_{out}$ flowing through the light emitting diode LED to become equal or proportional to the reference current $I_{ref}$. The current regulating unit further has a feedback detecting terminal for providing a feedback signal $V_{fb}$, representative of a current regulation characteristic voltage of the current regulation circuit 24.

In the embodiment shown in FIG. 2, the current setting unit is constructed by a reference current source $I_{ref}$ and a transistor Q1 while the current regulating unit is constructed by transistors Q2 and Q3 and an operational amplifier OP. The transistors Q1 and Q2 form a current mirror structure: the gate electrode of the transistor Q1 is coupled to the gate electrode of the transistor Q2; the source electrode of the transistor Q1 and the source electrode of the transistor Q2 are both coupled to the ground potential; and the gate and drain electrodes of the transistor Q1 are coupled together. Therefore, when the reference current source $I_{ref}$ is applied to the transistor Q1, the drive current $I_{out}$ flowing into the drain electrode of the transistor Q2 is K times larger than the reference current source $I_{ref}$ if the size (i.e. the width-to-length ratio of the current channel) of the transistor Q2 is designed to be K times larger than that of the Q1. In this case, the drain electrode of the transistor Q2 may serve as the current regulating terminal so as to be coupled to the cathode (n-type electrode) of the light emitting diode such that a certain amount of brightness is radiated out of the light emitting diode LED though the regulated drive current $I_{out}$. In order to establish a proportional relationship between the drive current $I_{out}$ and the reference current source $I_{ref}$ as precisely as expected in the current mirror structure, the drain electrode of the transistor Q1 should be preferably kept as closer to the drain electrode of the transistor Q2 as possible in terms of the voltage potential. For this reason, the current regulating unit provides a voltage follower formed by the operational amplifier OP and the transistor Q3. More specifically, the operational amplifier OP has an inverting input terminal (−) coupled to the drain electrode of the transistor Q1 and a non-inverting input terminal (+) coupled to the drain electrode of the transistor Q2. The transistor Q3 has a source electrode coupled to the drain electrode of the transistor Q2 and a drain electrode coupled to the reference current source $I_{ref}$. Through using an output terminal of the operational amplifier OP to control the gate electrode of the transistor Q3, the drain electrode of the transistor Q1 and the drain electrode of the transistor Q2 may be substantially kept at the same voltage potential.

The charge pump drive circuit 20 according to the first embodiment of the present invention executes a constant current method for driving the light emitting diode LED so as to effectively control the brightness of the light emitting diode LED. However, the conventional charge pump drive circuit 10 shown in FIG. 1(a) executes a constant voltage method, as described in detail earlier, and then fails to control the brightness of the light emitting diode LED. With respect to the constant current driving method according to the present invention, in order to empower the current regulation circuit 24 to perform the function of regulating current, a high enough operational voltage should be maintained at the drain electrodes of the transistors Q1 and Q2 so as to ensure that the transistors Q1 and Q2 are operated in the saturation region. Therefore, in the charge pump drive circuit 20 according to the first embodiment of the present invention, the feedback detecting terminal may be implemented by the inverting input terminal (−) of the operational amplifier OP. As described earlier, the inverting input terminal (−) of the operational amplifier OP is coupled to the drain electrode of the transistor Q1 and causes the voltage thereof to follow the non-inverting input terminal (+) of the operational amplifier OP, i.e. the voltage at the drain electrode of the transistor Q2. As a result, the feedback signal $V_{fb}$ provided from the feedback detecting terminal is a representative of the voltage at the drain electrodes of the transistors Q1 and Q2. Based on a difference between feedback signal $V_{fb}$ and the reference voltage source $V_{ref}$, the error amplifier 25 generates an error signal $V_{err}$ for controlling the variable resistance unit VAR. Since the variable resistance unit VAR provides a variable resistance in series between the input voltage source $V_{in}$ and the pumping capacitor Cp, the charging current into the pumping capacitor Cp during the charging phase may be adjusted and the discharging current out of the pumping capacitor Cp during the discharging phase may be adjusted, thereby effectively regulating the drive voltage $V_{out}$ provided by the pumping capacitor Cp. Finally through a typical filter 26 for removing some possible ripples, the drive voltage $V_{out}$ is supplied to the anode (p-type electrode) of the light emitting diode LED. Because the variation of the drive voltage $V_{out}$ induces the variation of the voltage at the drain electrodes of the transistors Q1 and Q2 when the light emitting diode LED is turned ON, the feedback signal $V_{fb}$ is effectively regulated to become equal to the reference voltage source $V_{ref}$ through the error signal $V_{err}$ and the variable resistance unit VAR. Therefore, under the condition that the reference voltage source $V_{ref}$ is set high enough for allowing the transistors Q1 and Q2 to operate in the saturation region, the current regulation circuit 24 is sufficiently empowered to regulate the drive current $I_{out}$ under the drive voltage $V_{out}$.

It should be noted that in regard to the origin of the feedback signal $V_{fb}$, the charge pump drive circuit 20 according to the first embodiment of the present invention is obviously different from the conventional charge pump drive circuit 10 shown in FIG. 1(a) because the conventional charge pump drive circuit 10 directly detects the drive voltage $V_{out}$ or its division to generate the feedback signal $V_{fb}$ with the only purpose of sustaining the drive voltage $V_{out}$ at a predetermined regulation value. However, the charge pump drive circuit 20 according to the first embodiment of present invention generates the feedback signal $V_{fb}$ through detecting the current regulation characteristic voltage, i.e. the voltage at the drain electrodes of the transistors Q1 and Q2 so as to make sure that the current regulating function is executed. Moreover, the drive voltage $V_{out}$ output from the charge pump drive circuit 20 according to the first embodiment of the present invention is allowed to be set as low as possible if the current regulation circuit 24 remains sufficiently empowered to perform the current regulating function. For this reason, the charge pump drive circuit 20 according to the first embodiment of the present invention achieves a better driving efficiency than the conventional charge pump drive circuit 10.

The variable resistance unit VAR may be implemented by an equivalent conductive resistance $R_{ds(on)}$ of a current channel between drain and source electrodes in a metal-oxide-semiconductor (MOS) transistor. More specifically, the current channel between drain and source electrodes of the MOS transistor is coupled in series between the input voltage source $V_{in}$ and the charge pump 22 and at the same time the gate electrode of the MOS transistor is controlled by the error signal $V_{err}$. Through adjusting the equivalent conductive resistance $R_{ds(on)}$ of the current channel between drain and source electrodes in the MOS transistor by the error signal $V_{err}$, the current flowing between the input voltage source $V_{in}$ and the charge pump 22 is effectively controlled whether during the charging or discharging phases.

Figure 3:
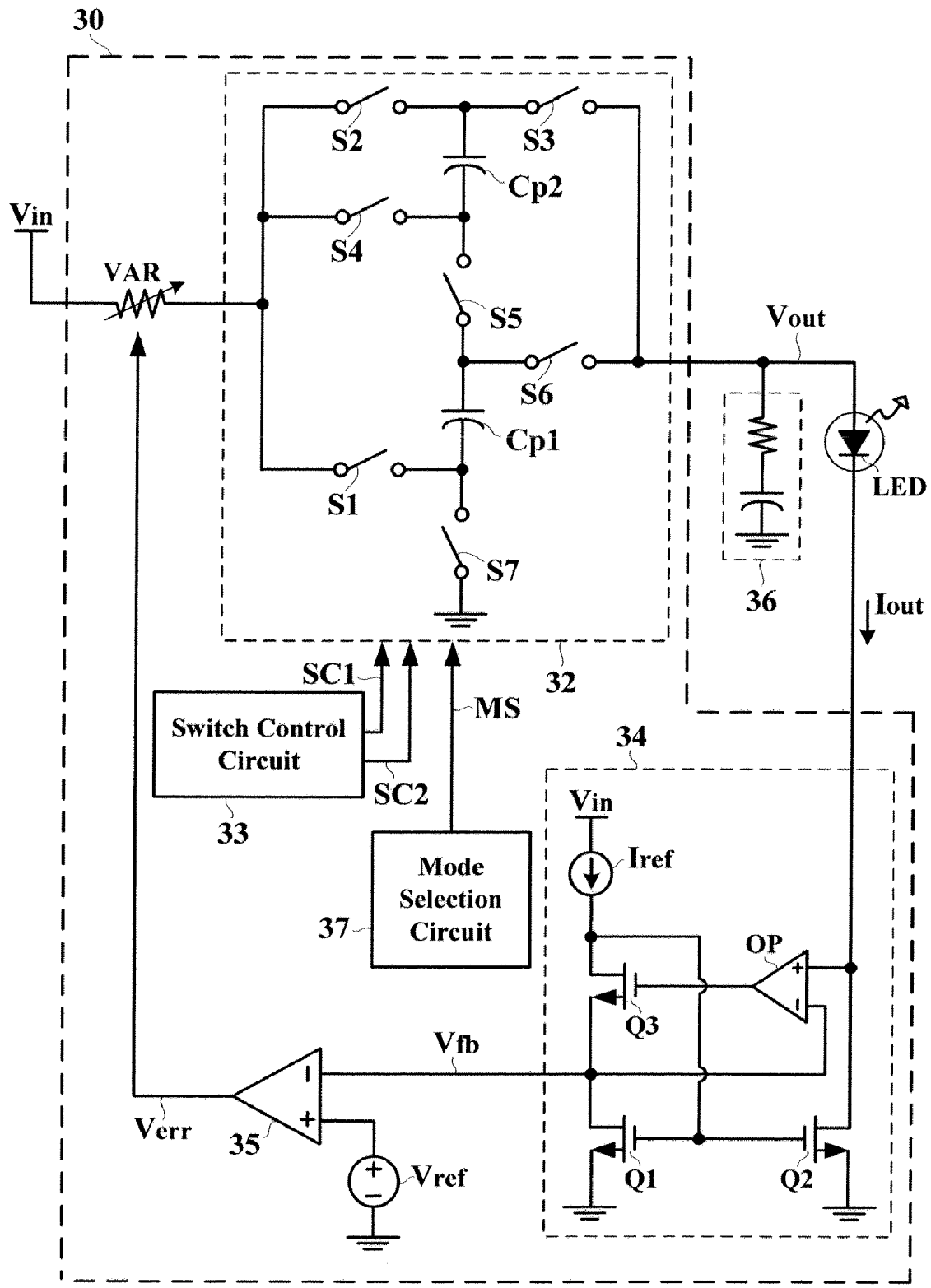
FIG. 3 is a detailed circuit diagram showing a charge pump drive circuit for a light emitting diode according to a second embodiment of the present invention.

FIG. 3 is a detailed circuit diagram showing a charge pump drive circuit 30 for a light emitting diode according to a second embodiment of the present invention. The second embodiment is different from the first embodiment in that the charge pump drive circuit 30 of the second embodiment employs a multi-mode charge pump 32. More specifically, the multi-mode charge pump 32 consists of seven switches S1 to S7 and two pumping capacitors Cp1 and Cp2, all coupled together to form the circuit configuration as shown in FIG. 3. Through appropriately controlling the ON and OFF operations of the switches S1 to S7, the multi-mode charge pump 32 may be operated in a 1:1, 1:1.5, or 1:2 modes. In the 1:1 mode, the switches S1 and S7 are turned OFF while the switches S2 to S6 are turned ON, thereby generating a drive voltage $V_{out}$ that is equal to the input voltage source $V_{in}$.

In the 1:1.5 mode, the multi-mode charge pump 32 is operated alternately between a charging phase and a discharging phase in accordance with switch control signals SC1 and SC2 generated from a switch control circuit 33 so as to generate a drive voltage $V_{out}$ that is equal to 1.5 times as large as the input voltage source $V_{in}$. During the charging phase, the switches S1, S3, S4, and S6 are turned OFF while the switches S2, S5, and S7 are turned ON. During the discharging phase, the switches S2, S5, and S7 are turned OFF while the switches S1, S3, S4, and S6 are turned ON.

In the 1:2 mode, the multi-mode charge pump 32 is operated alternately between a charging phase and a discharging phase in accordance with switch control signals SC1 and SC2 generated from a switch control circuit 33 so as to generate a drive voltage $V_{out}$ that is equal to 2 times as large as the input voltage source $V_{in}$. During the charging phase, the switches S1, S2, S3, and S6 are turned OFF while the switches S4, S5, and S7 are turned ON. During the discharging phase, the switches S2, S3, S4, S5, and S7 are turned OFF while the switches S1 and S6 are turned ON.

In order to select an operational mode at which the multi-mode charge pump 32 is about to be operated, the charge pump drive circuit 30 according to the second embodiment of the present invention is provided with a mode selection circuit 37 for applying a mode selection signal MS to the multi-mode charge pump 32. Through detecting any one of the input voltage source $V_{in}$, the drive voltage $V_{out}$, and the feedback signal $V_{fb}$ or even their various combinations, the mode selection circuit 37 determines in which one of the 1:1, 1:1.5, and 1:2 modes the multi-mode charge pump 32 should be operated at this moment. Since the input voltage source $V_{in}$ usually decreases gradually along with time when in use, such as in the case where the input voltage source $V_{in}$ is implemented by a portable battery or the like, the multi-mode charge pump 32 should be set in a mode having a relatively small multiplicative ratio when the input voltage source $V_{in}$ has a relatively high level at the beginning of the battery's life, but the multi-mode charge pump 32 should be changed to a mode having a relatively large multiplicative ratio when the input voltage source $V_{in}$ decreases to a relatively low level later in use.

As an alternative way, it is through detecting the drive voltage $V_{out}$ that the mode selection circuit 37 determines at which mode the multi-mode charge pump 32 should be set to operate. More specifically, once the multi-mode charge pump 32 is operated in a mode having a relatively small multiplicative ratio but fails to provide a high enough drive voltage $V_{out}$, the multi-mode charge pump 32 is determined ready to be changed into a mode having a relatively large multiplicative ratio. To the contrary, once the multi-mode charge pump 32 is operated in a mode having a relatively large multiplicative ratio and provides a higher-than-necessary drive voltage $V_{out}$, the multi-mode charge pump 32 is determined ready to be changed into a mode having a relatively small multiplicative ratio so as to avoid unnecessary power consumption and then enhance the driving efficiency.

As a still alternative way, it is on the basis of the feedback signal $V_{fb}$ that the mode selection circuit 37 determines at which mode the multi-mode charge pump 32 should be set to operate. More specifically, when the multi-mode charge pump 32 is operating in a mode having a relatively small multiplicative ratio, if it is observed that the current regulation circuit 34 fails to provide the necessary drive current $I_{out}$ because the feedback signal $V_{fb}$ is lower than the reference voltage source $V_{ref}$, the multi-mode charge pump 32 is determined ready to be changed into a mode having a relatively large multiplicative ratio. To the contrary, when the multi-mode charge pump 32 is operating in a mode having a relatively large multiplicative ratio, if it is observed that the feedback signal $V_{fb}$ is much higher than the reference voltage source $V_{ref}$, the multi-mode charge pump 32 is determined ready to be changed into a mode having a relatively small multiplicative ratio so as to avoid unnecessary power consumption and then enhance the driving efficiency.

It is should be noted that the multi-mode charge pump 32 according to the present invention is not limited to the circuit configuration and multiplicative ratios mentioned with regard to FIG. 3, but may be implemented by other charge pump structures executing the charging/discharging techniques of the pumping capacitors and various multiplicative ratios, so as to convert the input voltage source $V_{in}$ into the drive voltage $V_{out}$.

Figure 4:
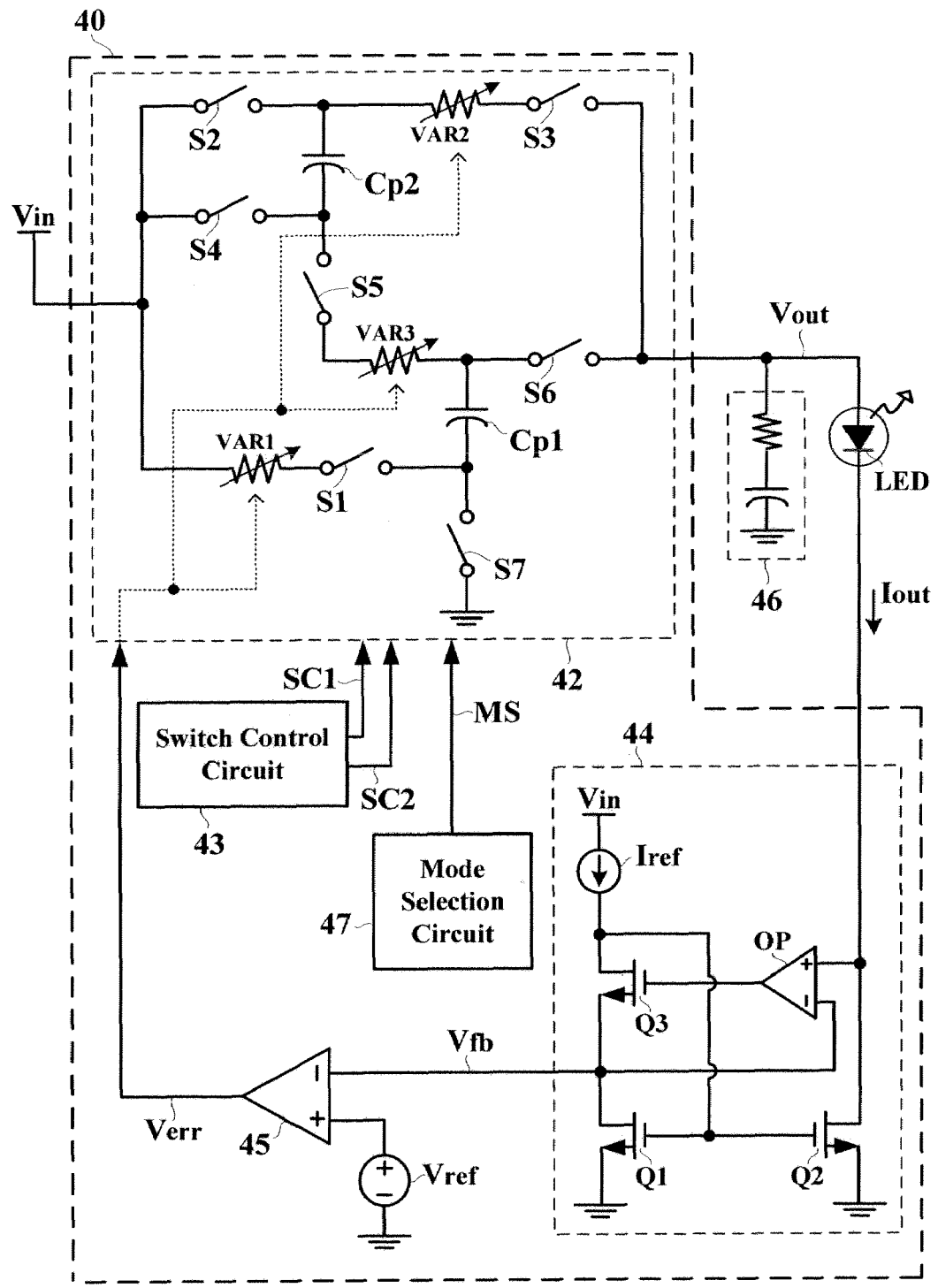
FIG. 4 is a detailed circuit diagram showing a charge pump drive circuit for a light emitting diode according to a third embodiment of the present invention.

FIG. 4 is a detailed circuit diagram showing a charge pump drive circuit 40 for a light emitting diode according to a third embodiment of the present invention. The third embodiment is different from the second embodiment in that the third embodiment simultaneously employs three variable resistance units VAR1, VAR2, and VAR3, which are separate with respect to one another, to replace the single variable resistance unit VAR of the second embodiment. More specifically, the first variable resistance unit VAR1 is connected in series to the switch S1, the second variable resistance unit VAR2 is connected in series to the switch S3, and the third variable resistance unit VAR3 is connected in series to the switch S5. Like the single variable resistance unit VAR in the second embodiment, each of the variable resistance units VAR1, VAR2, and VAR3 in the third embodiment are simultaneously controlled by an error signal $V_{err}$ generated from an error amplifier 45. When the switch S1 is turned ON, the first variable resistance unit VAR1 may adjust the current flowing into/out of the first pumping capacitor Cp1 through the switch S1. When the switch S3 is turned ON, the second variable resistance unit VAR2 may adjust the current flowing into/out of the second pumping capacitor Cp2 through the switch S3. When the switch S5 is turned ON, the third variable resistance unit VAR3 may adjust the current flowing into/out of the first pumping capacitor Cp1 or the second pumping capacitor Cp2 through the switch S5.

Figure 5:
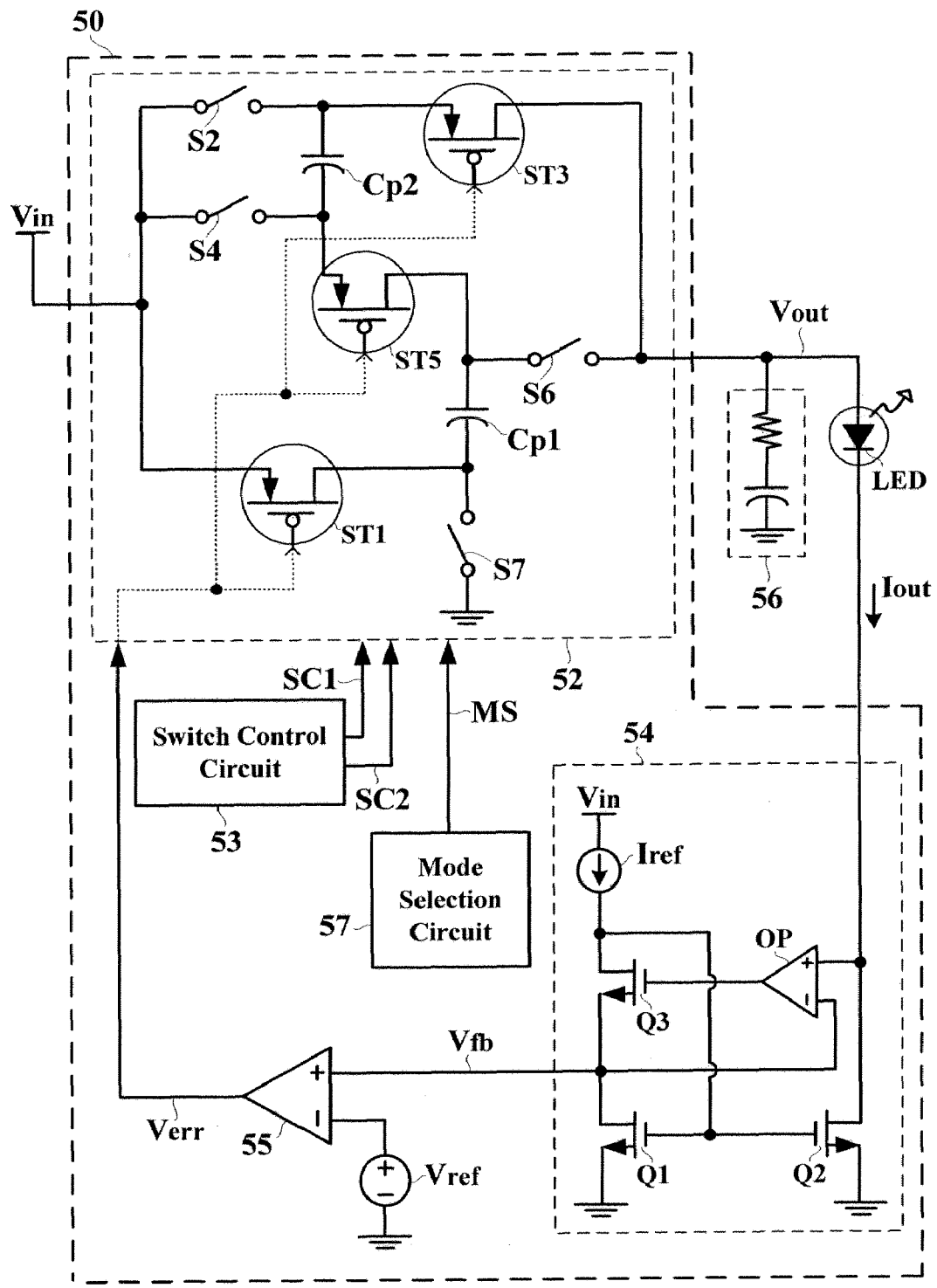
FIG. 5 is a detailed circuit diagram showing a charge pump drive circuit for a light emitting diode according to a fourth embodiment of the present invention.

FIG. 5 is a detailed circuit diagram showing a charge pump drive circuit 50 for a light emitting diode according to a fourth embodiment of the present invention. The fourth embodiment is different from the third embodiment in that the fourth embodiment employs three P-type MOS transistors ST1, ST2, and ST5 to correspondingly replace the switch S1 and the variable resistance unit VAR1, the switch S3 and the variable resistance unit VAR2, and the switch S5 and the variable resistance unit VAR3. As well-known by one skilled in the art, the MOS transistor not only has the simple features of being turned ON and OFF, but also adjusts the equivalent conductive resistance $R_{ds(on)}$ of the current channel between drain and source electrodes in response to the voltage control signal at the gate electrode when the MOS transistor is turned ON. Therefore, the MOS transistor is capable of executing the circuit functions originating from the switch as well as from the variable resistance unit. The P-type MOS transistors ST1, ST3, and ST5 are turned ON/OFF in response to switch control signals SC1 and SC2 generated from a switch control circuit 53, and for each of them the equivalent conductive resistance $R_{ds(on)}$ of the current channel between drain and source electrodes thereof is adjusted in response to an error signal $V_{err}$ generated from an error amplifier 55.

More specifically, the P-type MOS transistor ST1 has a source electrode coupled to the input voltage source $V_{in}$, and a drain electrode coupled to the first electrode of the first pumping capacitor Cp1 and the switch S7. When the P-type MOS transistor ST1 is turned ON, the error signal $V_{err}$ generated from the error amplifier 55 is applied to the gate electrode of the P-type MOS transistor ST1 and then adjusts the current flowing through the current channel of the P-type MOS transistor ST1. The P-type MOS transistor ST3 has a source electrode coupled to the first electrode of the second pumping capacitor Cp2 and the switch S2, and a drain electrode coupled to the switch S6 and the drive voltage $V_{out}$. When the P-type MOS transistor ST3 is turned ON, the error signal $V_{err}$ generated from the error amplifier 55 is applied to the gate electrode of the P-type MOS transistor ST3 and then adjusts the current flowing through the current channel of the P-type MOS transistor ST3. The P-type MOS transistor ST5 has a source electrode coupled to the second electrode of the second pumping capacitor Cp2 and the switch S4, and a drain electrode coupled to the second electrode of the first pumping capacitor Cp1 and the switch S6. When the P-type MOS transistor ST5 is turned ON, the error signal $V_{err}$ generated from the error amplifier 55 is applied to the gate electrode of the P-type MOS transistor ST5 and then adjusts the current flowing through the current channel of the P-type MOS transistor ST5.

Figure 6A:
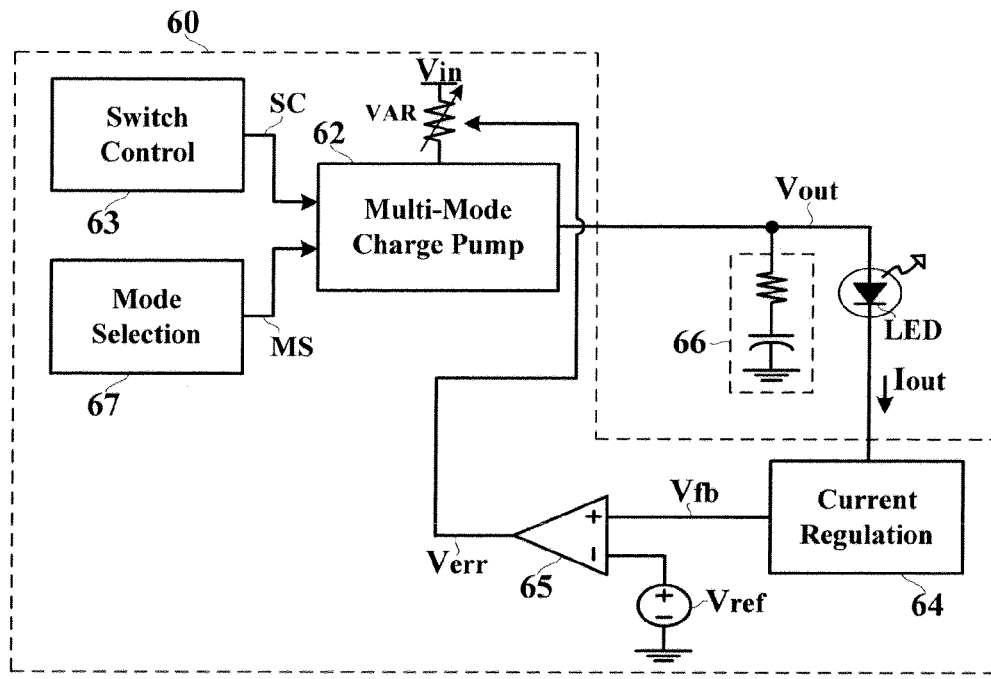
FIGS. 6(a) and 6(b) are functional circuit block diagrams showing a multi-mode charge pump drive circuit of FIGS. 2 to 5.
Figure 6B:
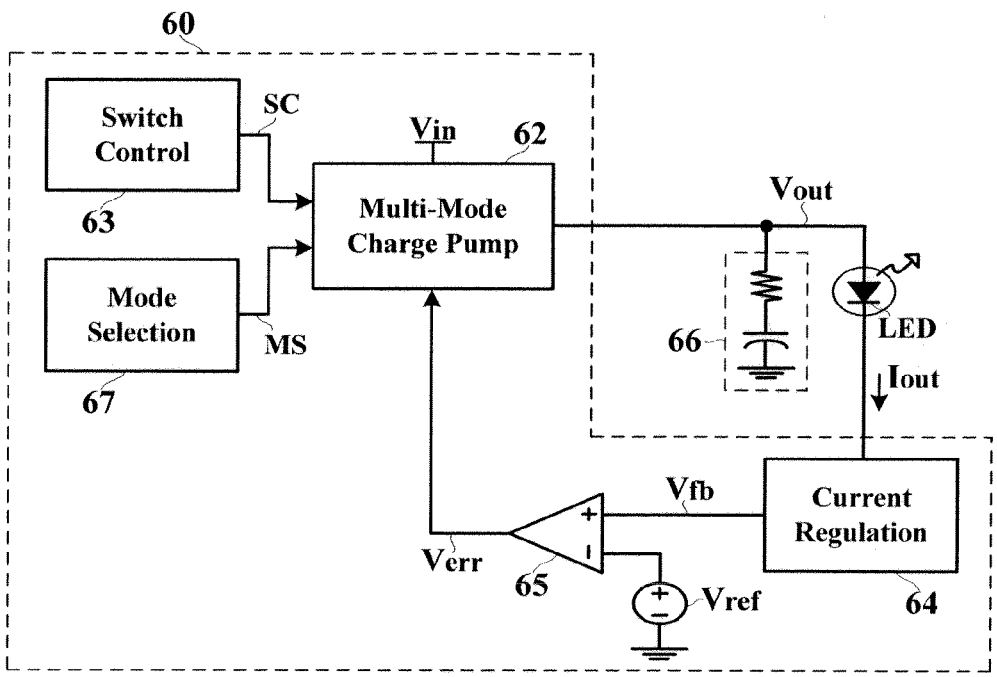

The second to the fourth embodiments shown in FIGS. 3 to 5 are all related to the multi-mode charge pump drive circuit. For the sake of simplicity and a clearer presentation of inventive characteristics in the following embodiments, the multi-mode charge pump drive circuit according to the present invention is illustrated by way of functional circuit blocks in FIGS. 6(a) and 6(b). FIG. 6(a) represents the second embodiment of FIG. 3, wherein the variable resistance unit VAR is coupled between the input voltage source $V_{in}$ and the multi-mode charge pump 62. FIG. 6(b) represents the third embodiment of FIG. 4, wherein the variable resistance unit VAR is arranged within the multi-mode charge pump 62, or the fourth embodiment of FIG. 5, wherein the internal switches of the multi-mode charge pump 62 provide the equivalent conductive resistance $R_{ds(on)}$.

As described above, the multi-mode charge pump drive circuit 60 primarily has the functional circuit blocks such as a multi-mode charge pump 62, a switch control circuit 63, a current regulation circuit 64, and an error amplifier 65. The further descriptions of the functional circuit blocks are omitted in the following paragraphs since each of them has already been described in detail with respect to the operations and the coupling relationship between one another. The multi-mode charge pump 62 is operated with a plurality of modes, each of which provides a different multiplicative ratio for converting the input voltage source $V_{in}$ into the drive voltage $V_{out}$. As described in the second to the fourth embodiments of FIGS. 3 to 5, in each of the modes of the multi-mode charge pump 62, it is effective to adjust the current flowing between the input voltage source $V_{in}$ and the multi-mode charge pump 62 through controlling the variable resistance unit VAR or the equivalent conductive resistance $R_{ds(on)}$ by the error signal $V_{err}$ of the error amplifier 65. However, at the moment when the mode of the multi-mode change pump changes from one to another, the voltages at the terminals of the pumping capacitors are often required to instantaneously jump or dive, resulting in a huge input noise in the current flowing between the input voltage source $V_{in}$ and the multi-mode charge pump 62. Moreover, at the moment of mode change, it is possible for the error signal $V_{err}$ of the error amplifier 65 to reduce into such a low level that the current flowing between the input voltage source $V_{in}$ and the multi-mode charge pump 62 is not suppressed any longer by the error signal $V_{err}$ and therefore the input noise is not effectively prevented.

Figure 7A:
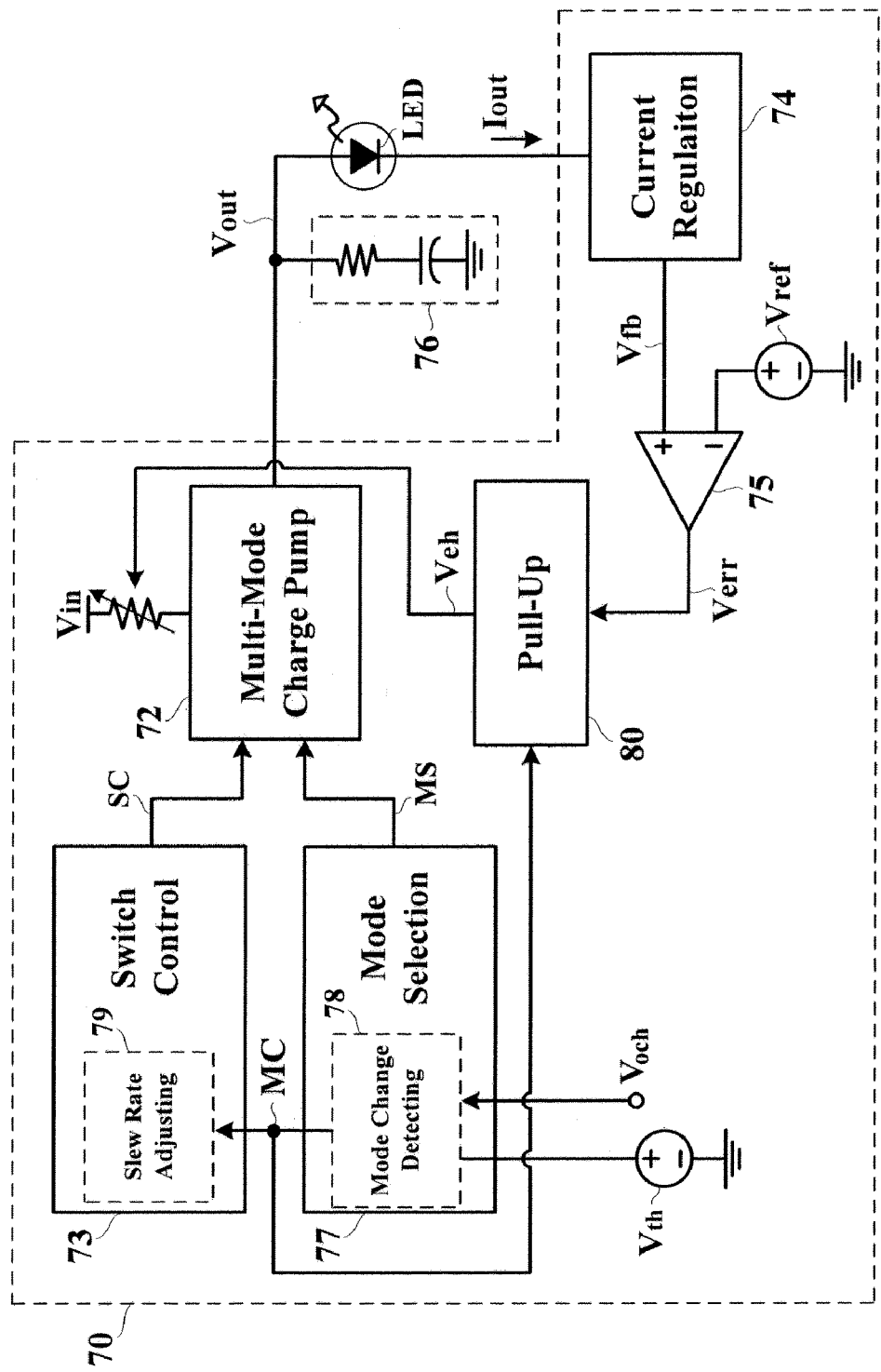
FIGS. 7(a) and 7(b) are functional circuit block diagrams showing a multi-mode charge pump drive circuit with improved input noise at a moment of mode change.
Figure 7B:
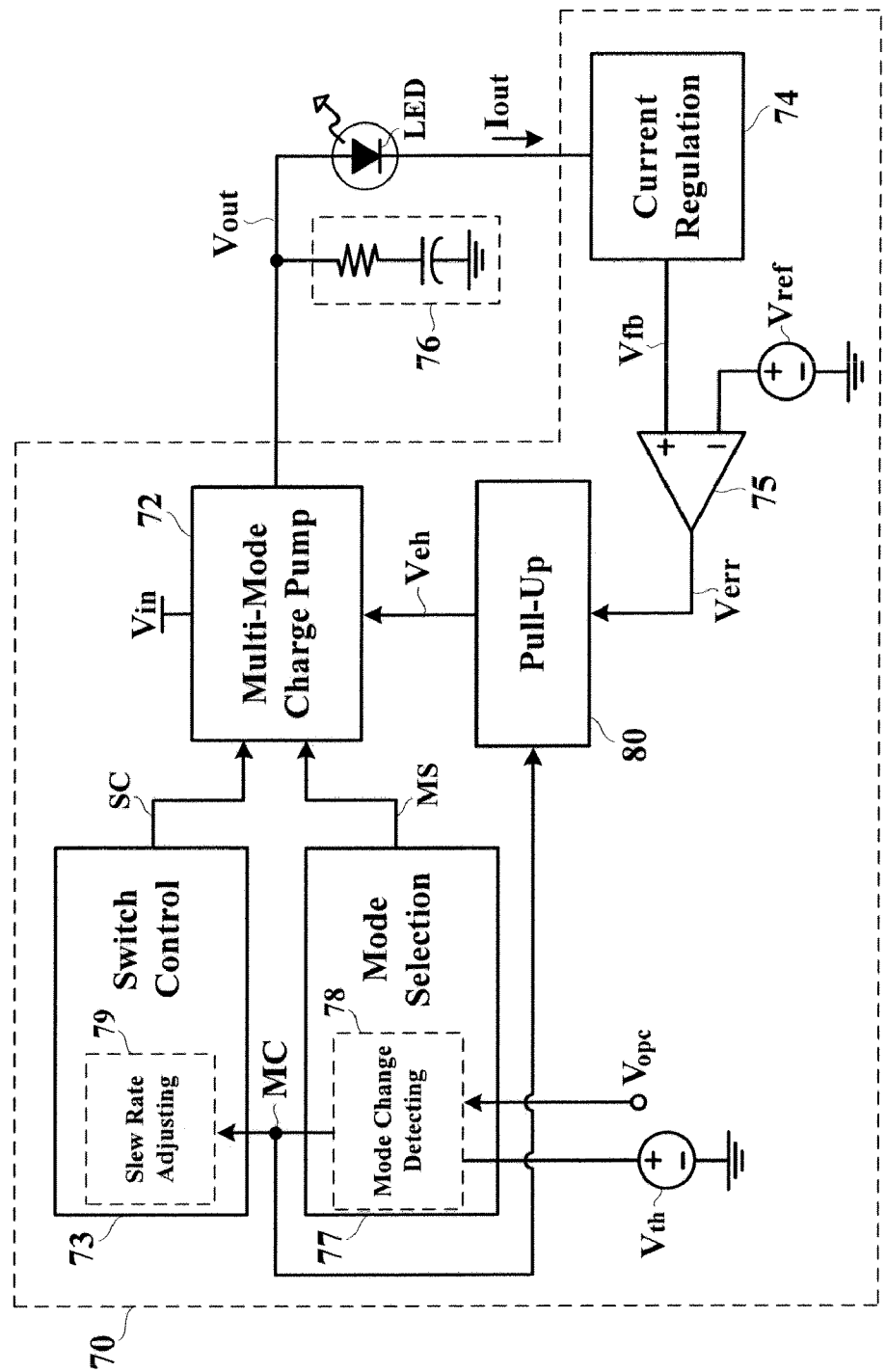

FIG. 7(a) shows a first example of a multi-mode charge pump drive circuit 70 with improved input noise at a moment of mode change. The first example of FIG. 7(a) is applicable to the second embodiment of FIG. 3, wherein the variable resistance unit VAR is coupled between the input voltage source $V_{in}$ and the multi-mode charge pump 72. FIG. 7(b) shows a second example of a multi-mode charge pump drive circuit 70 with improved input noise at a moment of mode change. The second example of FIG. 7(b) is applicable to the third embodiment of FIG. 4, wherein the variable resistance unit VAR is arranged within the multi-mode charge pump 72, or the fourth embodiment of FIG. 5, wherein the internal switches of the multi-mode charge pump 72 provide the equivalent conductive resistance $R_{ds(on)}$.

As described above, the multi-mode charge pump drive circuit 70 according to the present invention is provided with a mode selection circuit 77 for applying a mode selection signal MS to the multi-mode charge pump 72. Through detecting any one of the input voltage source $V_{in}$, the drive voltage $V_{out}$, and the feedback signal $V_{fb}$ or even their various combinations, the mode selection circuit 77 determines in which one of the 1:1, 1:1.5, and 1:2 modes the multi-mode charge pump 72 should be operated at this moment. More specifically, the mode selection circuit 77 is provided with a mode change detecting unit 78 for comparing an operational characteristic signal $V_{och}$ and a threshold reference signal $V_{th}$ so as to determine when to change the mode.

In one embodiment, the operational characteristic signal $V_{och}$ may be implemented by the input voltage source $V_{in}$. Since the input voltage source $V_{in}$ usually decreases gradually along with time when in use, such as in the case where the input voltage source $V_{in}$ is implemented by a portable battery or the like, the multi-mode charge pump 72 should be set in a mode having a relatively small multiplicative ratio when the input voltage source $V_{in}$ has a relatively high level at the beginning of the battery's life, but the multi-mode charge pump 72 should be changed to a mode having a relatively large multiplicative ratio when the input voltage source $V_{in}$ decreases to a relatively low level later in use.

In another embodiment, the operational characteristic signal $V_{och}$ may be implemented by the drive voltage $V_{out}$. Once the multi-mode charge pump 72 is operated in a mode having a relatively small multiplicative ratio but fails to provide a high enough drive voltage $V_{out}$, the multi-mode charge pump 72 is determined ready to be changed into a mode having a relatively large multiplicative ratio. To the contrary, once the multi-mode charge pump 72 is operated in a mode having a relatively large multiplicative ratio and provides a higher-than-necessary drive voltage $V_{out}$, the multi-mode charge pump 72 is determined ready to be changed into a mode having a relatively small multiplicative ratio so as to avoid unnecessary power consumption and then enhance the driving efficiency.

In still another embodiment, the operational characteristic signal $V_{och}$ may be implemented by the error signal $V_{err}$. When the multi-mode charge pump 72 is operating in a mode having a relatively small multiplicative ratio, if it is observed that the error signal $V_{err}$ reduces to a lower level than the threshold reference signal $V_{th}$, the multi-mode charge pump 72 is determined ready to be changed into a mode having a relatively large multiplicative ratio. To the contrary, when the multi-mode charge pump 72 is operating in a mode having a relatively large multiplicative ratio, if it is observed that the error signal $V_{err}$ is getting higher and higher, the multi-mode charge pump 72 is determined ready to be changed into a mode having a relatively small multiplicative ratio so as to avoid unnecessary power consumption and then enhance the driving efficiency.

Therefore, whether the operational characteristic signal $V_{och}$ is implemented by the input voltage source $V_{in}$, the drive voltage $V_{out}$, or the error signal $V_{err}$, the mode change detecting unit 78 generates a mode change signal MC when the mode change detecting unit 78 detects that the operational characteristic signal $V_{och}$ reduces to become lower than the threshold reference signal $V_{th}$. In response to the mode change signal MC, the mode selection circuit 77 changes the mode of the multi-mode charge pump 72.

As described above, the switch control circuit 73 applies a switch control signal SC to the multi-mode charge pump 72 for controlling the multi-mode charge pump 72 to operate alternately between the charging phase and the discharging phase. The switch control signal SC has a slew rate of edge, i.e., the rising rate of the rising edge and/or the falling rate of the falling edge, for determining the rate of transferring between the charging phase and the discharging phase. In order to improve the input noise at the moment of mode change, the switch control circuit 73 is provided with a slew rate adjusting unit 79 for adjusting the slew rate of the switch control signal SC generated from the switch control circuit 73. Since the switch control signal SC generated from the switch control circuit 73 is applied to control the switches of the multi-mode charge pump 72, the slew rate of the switch control signal SC determines the rate of transferring from the nonconductive state into the conductive state (or from the conductive state into the nonconductive state) of the switches. Therefore, at the moment when the multi-mode charge pump 72 changes the mode, the slew rate adjusting unit 79 reduces the slew rate of the switch control signal SC in response to the mode change signal MC, such that the switches of the multi-mode charge pump 72 transfers at a significantly slow rate from one state into another, thereby preventing the voltages at the terminals of the pumping capacitors from instantaneously jumping or diving.

As described above, when the multi-mode charge pump 72 is operating in a mode having a relatively small multiplicative ratio, if it is observed that the error signal $V_{err}$ reduces to a lower level than the threshold reference signal $V_{th}$, the multi-mode charge pump 72 is determined ready to be changed into a mode having a relatively large multiplicative ratio. Since the error signal $V_{err}$ adjusts the current flowing between the input voltage source $V_{in}$ and the multi-mode charge pump 72, the error signal $V_{err}$, which is reduced at the moment when the multi-mode charge pump 72 changes the mode, fails to suppress the dramatic variation of the current. In order to improve this disadvantage, the multi-mode charge pump drive circuit 70 according to the present invention is further provided with a pull-up circuit 80. In response to the mode change signal MC generated from the mode change detecting unit 78, the pull-up circuit 80 instantaneously pulls up the error signal $V_{err}$ into an enhancement signal $V_{eh}$. The enhancement signal $V_{eh}$ is applied to the variable resistance unit VAR shown in FIG. 7(a) or to the multi-mode charge pump 72 shown in FIG. 7(b), for suppressing the current flowing between the input voltage source $V_{in}$ and the multi-mode charge pump 72 so as to improve the input noise at the moment of mode change.

Figure 8:
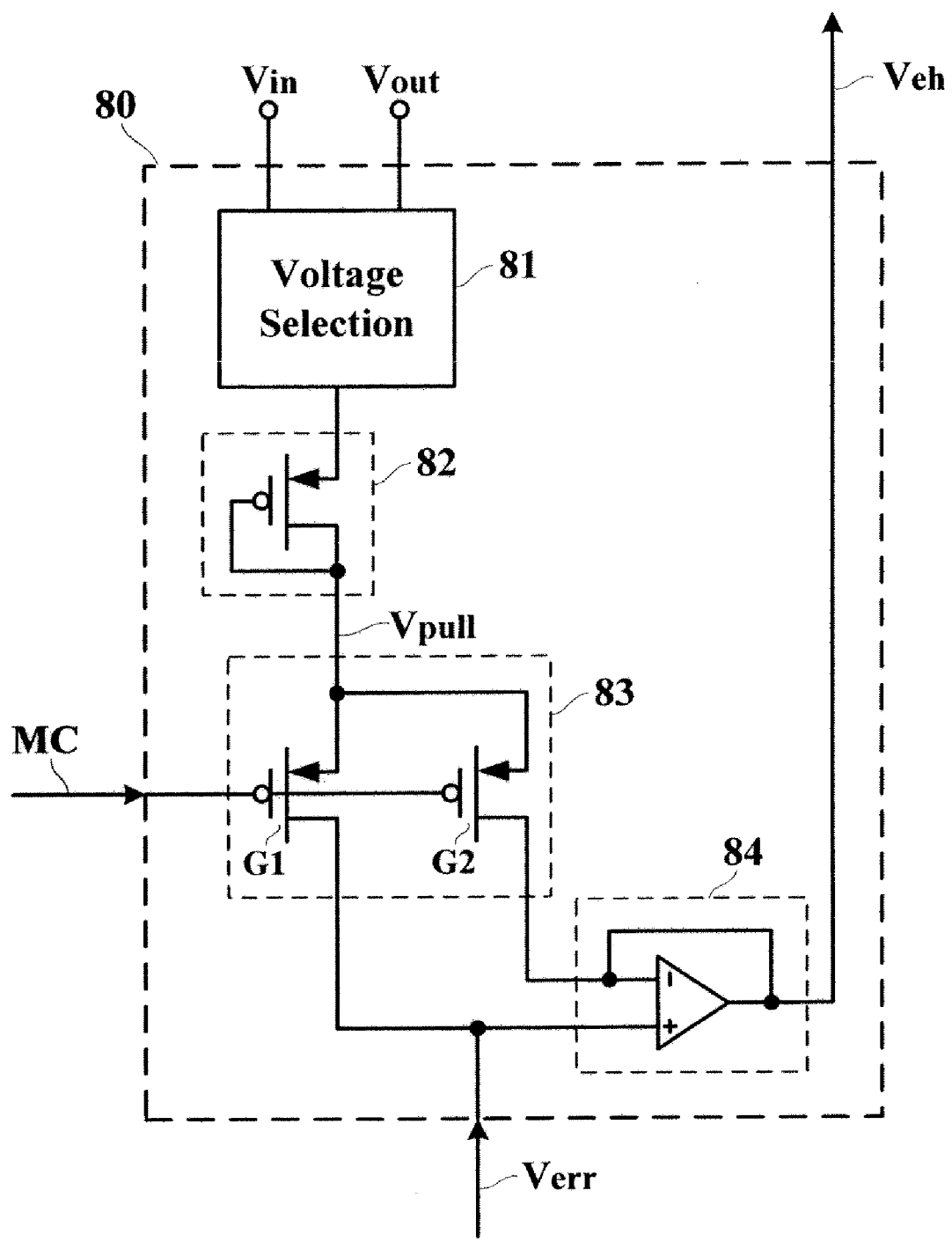
FIG. 8 is a detailed circuit diagram showing a pull-up circuit according to the present invention.

FIG. 8 is a detailed circuit diagram showing a pull-up circuit 80 according to the present invention. Referring to FIG. 8, the pull-up circuit 80 is provided with a voltage selecting unit 81, a voltage reducing unit 82, a switching unit 83, and a buffering unit 84. The voltage selecting unit 81 selects the larger voltage from a group consisting of the input voltage source $V_{in}$ and the drive voltage $V_{out}$. The larger voltage is reduced by the voltage reducing unit 82 so as to form a pull-up voltage $V_{pull}$. As shown in figure, the voltage reducing unit 82 may be implemented by a diode-connected PMOS transistor. The switching unit 83 is controlled by the mode change signal MC for allowing or blocking the pull-up voltage $V_{pull}$ to be applied to the buffering unit 84. As shown in figure, the switching unit 83 may be implemented by two PMOS transistors G1 and G2. The mode change signal MC is applied to gate electrodes of the PMOS transistors G1 and G2. When the PMOS transistors G1 and G2 are turned on, the pull-up voltage $V_{pull}$ may be applied to the buffering unit 84. The buffering unit 84 serves as an output stage of the pull-up circuit 80. As shown in figure, the buffering unit 84 may be implemented by an operational amplifier having a non-inverting input terminal for receiving the error signal $V_{err}$ and an inverting input terminal being coupled to an output terminal so as to form a unitary gain configuration. During the period when the mode is fixed, the mode change signal MC is at an inactive level such that the transistors G1 and G2 of the switching unit 83 are turned off so as to block the pull-up voltage $V_{pull}$ from being applied to the buffering unit 84. In this case, the enhancement signal $V_{eh}$ is substantially implemented by the error signal $V_{err}$. However, at the moment when the mode changes, the mode change signal MC is at an active level such that the transistors G1 and G2 are turned on so as to allow the pull-up voltage $V_{pull}$ to be applied to the buffering unit 84. In this case, the enhancement signal $V_{eh}$ is substantially implemented by the pull-up voltage $V_{pull}$.

While the invention has been described by way of examples and in terms of preferred embodiments, it is to be understood that the invention is not limited to the disclosed embodiments. To the contrary, it is intended to cover various modifications. Therefore, the scope of the appended claims should be accorded the broadest interpretation so as to encompass all such modifications.

What is claimed is:

1. A multi-mode charge pump drive circuit for driving a light emitting diode, comprising:

a multi-mode charge pump for converting an input voltage source into a drive voltage to be supplied to the light emitting diode, wherein the multi-mode charge pump is operated with a plurality of modes, each of which provides a different multiplicative ratio for converting the input voltage source into the drive voltage;

a switch control circuit for applying a switch control signal to the multi-mode charge pump so as to operate the multi-mode charge pump alternately between a charging phase and a discharging phase, wherein the switch control signal has a slew rate for determining a rate of transferring between the charging phase and the discharging phase;

a current regulation circuit having a current setting unit and a current regulating unit, the current setting unit being used for determining a reference current, the current regulating unit having a current regulating terminal and a feedback detecting terminal, the current regulating unit being coupled to the light emitting diode so as to control a current flowing through the light emitting diode to become proportional to the reference current, the feedback detecting terminal being used for providing a feedback signal representative of a current regulation characteristic voltage;

an error amplifier for generating an error signal based on a difference between the feedback signal and a reference voltage source;

a variable resistance unit coupled between the input voltage source and the multi-mode charge pump for adjusting a variable resistance in response to the error signal; and a mode selection circuit for controlling the multi-mode charge pump to selectively operate at one of the plurality of modes, wherein at a moment when the mode selection circuit changes the mode of the multi-mode charge pump, the mode selection circuit applies a mode change signal to the switch control circuit so as to reduce the slew rate of the switch control signal.

2. The multi-mode charge pump drive circuit according to claim 1, further comprising:

a pull-up circuit, coupled to an output terminal of the error amplifier, for pulling up the error signal in response to the mode change signal.

3. The multi-mode charge pump drive circuit according to claim 2, wherein:

the pull-up circuit comprises:

a voltage selecting unit for selecting a larger voltage from a group consisting of the input voltage source and the drive voltage;

a voltage reducing unit for reducing the larger voltage to form a pull-up voltage;

a buffering unit for serving as an output stage of the pull-up circuit; and a switching unit, coupled between the voltage selecting unit and the buffering unit, controlled by the mode change signal such that the pull-up voltage is allowed to be applied to the buffering unit when the switching unit is turned on.

4. The multi-mode charge pump drive circuit according to claim 3, wherein:

the error signal is output from the buffering unit when the switching unit is turned off, but the pull-up voltage is output from the buffering unit when the switching unit is turned on.

5. The multi-mode charge pump drive circuit according to claim 1, wherein:

the mode selection circuit determines when to change the mode of the multi-mode charge pump in accordance with one selected from a group consisting of the input voltage source, the drive voltage, and the error signal.

6. The multi-mode charge pump drive circuit according to claim 1, wherein:

the current setting unit has a reference current source and a first transistor, in which the first reference current source provides the reference current and a source electrode of the first transistor is coupled to a ground potential, and the current regulating unit has a second transistor, a third transistor, and an operational amplifier, in which a gate electrode of the second transistor is coupled to a gate electrode of the first transistor, a drain electrode of the second transistor serves as the current regulating terminal, a source electrode of the second transistor is coupled to the ground potential, a drain electrode of the third transistor is coupled to the reference current source and the gate electrode of the first transistor, a source electrode of the third transistor is coupled to a drain electrode of the first transistor, a non-inverting input terminal of the operational amplifier is coupled to the drain electrode of the second transistor, an inverting input terminal of the operational amplifier is coupled to the drain electrode of the first transistor and serves as the feedback detecting terminal, an output terminal of the operational amplifier is coupled to a gate electrode of the third transistor.

7. The multi-mode charge pump drive circuit according to claim 1, wherein:

the variable resistance unit is implemented by an equivalent conductive resistance of a current channel in a transistor.

8. The multi-mode charge pump drive circuit according to claim 7, wherein:

the current channel of the transistor is coupled between the input voltage source and the charge pump, and a gate electrode of the transistor is controlled by the error signal.

9. A multi-mode charge pump drive circuit for driving a light emitting diode, comprising:

a multi-mode charge pump for converting an input voltage source into a drive voltage to be supplied to the light emitting diode, wherein the multi-mode charge pump is operated with a plurality of modes, each of which provides a different multiplicative ratio for converting the input voltage source into the drive voltage, the multi-mode charge pump being provided with a plurality of variable resistance units;

a switch control circuit for applying a switch control signal to the multi-mode charge pump so as to operate the multi-mode charge pump alternately between a charging phase and a discharging phase, wherein the switch control signal has a slew rate for determining a rate of transferring between the charging phase and the discharging phase;

a current regulation circuit having a current setting unit and a current regulating unit, the current setting unit being used for determining a reference current, the current regulating unit having a current regulating terminal and a feedback detecting terminal, the current regulating unit being coupled to the light emitting diode so as to control a current flowing through the light emitting diode to become proportional to the reference current, the feedback detecting terminal being used for providing a feedback signal representative of a current regulation characteristic voltage;

an error amplifier for generating an error signal based on a difference between the feedback signal and a reference voltage source, the error signal being applied to the multi-mode charge pump for adjusting a variable resistance of at least one of the plurality of variable resistance units; and a mode selection circuit for controlling the multi-mode charge pump to selectively operate at one of the plurality of modes, wherein at a moment when the mode selection circuit changes the mode of the multi-mode charge pump, the mode selection circuit applies a mode change signal to the switch control circuit so as to reduce the slew rate of the switch control signal.

10. The multi-mode charge pump drive circuit according to claim 9, wherein:

each of the plurality of variable resistance units is implemented by an equivalent conductive resistance provided by a current channel in a transistor.

11. The multi-mode charge pump drive circuit according to claim 10, wherein:

the error signal is applied to a gate electrode of the transistor for adjusting the equivalent conductive resistance of the current channel.

12. The multi-mode charge pump drive circuit according to claim 9, further comprising:

a pull-up circuit, coupled to an output terminal of the error amplifier, for pulling up the error signal in response to the mode change signal.

13. The multi-mode charge pump drive circuit according to claim 12, wherein:

the pull-up circuit comprises:

a voltage selecting unit for selecting a larger voltage from a group consisting of the input voltage source and the drive voltage;

a voltage reducing unit for reducing the larger voltage to form a pull-up voltage;

a buffering unit for serving as an output stage of the pull-up circuit; and a switching unit, coupled between the voltage selecting unit and the buffering unit, controlled by the mode change signal such that the pull-up voltage is allowed to be applied to the buffering unit when the switching unit is turned on.

14. The multi-mode charge pump drive circuit according to claim 13, wherein:

the error signal is output from the buffering unit when the switching unit is turned off, but the pull-up voltage is output from the buffering unit when the switching unit is turned on.

15. The multi-mode charge pump drive circuit according to claim 9, wherein:

the mode selection circuit determines when to change the mode of the multi-mode charge pump in accordance with one selected from a group consisting of the input voltage source, the drive voltage, and the error signal.

* * * * *